(12) United States Patent
Shin et al.

(10) Patent No.: US 12,221,166 B2
(45) Date of Patent: Feb. 11, 2025

(54) CONNECTION STRUCTURE OF TUBULAR TYPE PILLARS

(71) Applicants: Hyundai Motor Company, Seoul (KR); Kia Corporation, Seoul (KR)

(72) Inventors: Joonghyun Shin, Hwaseong-si (KR); Chulhee Heo, Hwaseong-si (KR); Dae Seung Kim, Suwon-si (KR); Heedae Oh, Suwon-si (KR); Jung Jong Chun, Seoul (KR); Minsoo Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 272 days.

(21) Appl. No.: 17/951,295

(22) Filed: Sep. 23, 2022

(65) Prior Publication Data
US 2023/0399060 A1 Dec. 14, 2023

(30) Foreign Application Priority Data
Jun. 8, 2022 (KR) .......................... 10-2022-0069676

(51) Int. Cl.
*B62D 27/06* (2006.01)
*B62D 25/02* (2006.01)
*B62D 25/04* (2006.01)

(52) U.S. Cl.
CPC ........... *B62D 27/065* (2013.01); *B62D 25/02* (2013.01); *B62D 25/04* (2013.01)

(58) Field of Classification Search
USPC ...................................... 296/193.06
See application file for complete search history.

(56) References Cited

U.S. PATENT DOCUMENTS

| | | | | |
|---|---|---|---|---|
| 5,372,400 A * | 12/1994 | Enning | ................ | B62D 25/025 296/29 |
| 5,829,219 A * | 11/1998 | Sugawara | ............. | B21C 35/023 296/205 |
| 6,293,618 B1 * | 9/2001 | Sukegawa | ............ | B62D 29/008 296/205 |
| 9,308,941 B2 * | 4/2016 | Kanaguchi | ............. | B62D 25/04 |
| 10,532,640 B2 * | 1/2020 | Craig | ........................ | B60J 7/106 |
| 11,560,180 B2 * | 1/2023 | Matecki | ............... | B62D 25/025 |

* cited by examiner

*Primary Examiner* — Joseph D. Pape
(74) *Attorney, Agent, or Firm* — Slater Matsil, LLP (57) ABSTRACT

An embodiment connection structure of tubular type pillars includes an outer joint bracket coupled to a sill outer member of a side sill, wherein a lower portion of a pillar member is fitted and coupled to the outer joint bracket along a vehicle width direction, and an inner joint bracket coupled to a sill inner member and coupled to the outer joint bracket, wherein the sill inner member and the sill outer member are joined to each other.

20 Claims, 10 Drawing Sheets

CONNECTION STRUCTURE OF TUBULAR TYPE PILLARS

CROSS-REFERENCE TO RELATED APPLICATIONS

This application claims the benefit of Korean Patent Application No. 10-2022-0069676, filed on Jun. 8, 2022, which application is hereby incorporated herein by reference.

TECHNICAL FIELD

The present disclosure relates to a vehicle body of a vehicle.

BACKGROUND

In general, a space frame has the advantage of light weight and high rigidity, and thus is applied to a body of lightweight and small-volume production.

The space frame may be configured as an underbody and an upper body coupled to the underbody. For example, the space frame may be configured as an upper body in which tubular type members are employed.

The space frame may support the load applied to the vehicle body and the reaction force of the front and rear axles through the members. In addition, the space frame may realize structural variability (or expandability) of the upper body in the vehicle body length direction.

Therefore, securing the rigidity of the connection of the members is important for the space frame, and the space frame needs to have a characteristic that may absorb an external force (e.g., side impact load) while securing the rigidity of the vehicle body.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a vehicle body of a vehicle. Particular embodiments relate to a connection structure of tubular type pillars in which tubular type pillars and a side sill are combined.

Embodiments of the present disclosure provide a connection structure of tubular type pillars capable of securing connection rigidity of the tubular type pillars and a side sill while maintaining structural variability of an upper body in a vehicle body length direction.

An exemplary connection structure of tubular type pillars is formed by coupling of a pillar member of a tubular type to a side sill having a sill inner member and a sill outer member joined to each other, and the connection structure includes an outer joint bracket coupled to the sill outer member, and an inner joint bracket coupled to the sill inner member and coupled to the outer joint bracket, where a lower portion of the pillar member is fitted and coupled to the outer joint bracket along a vehicle width direction.

The outer joint bracket may include a pair of first forming portions extended outward from an outer surface of the outer joint bracket with a predetermined distance preset interval along a vehicle body length direction such that the lower portion of the pillar member may be fitted along the vehicle width direction.

The inner joint bracket may include a pair of second forming portions extended inward from an inner surface of the inner joint bracket with a predetermined distance along the vehicle body length direction and combined with the pair of first forming portions to form a box cross-section.

The sill outer member may include a joint support surface formed at a position lower than an upper portion of the sill inner member and configured to support a lower portion of the outer joint bracket coupled to the lower portion of the pillar member.

The sill inner member may include a first joint flange formed on an upper portion, a second joint flange formed on a lower portion, and a third forming portion connected to the first joint flange and the second joint flange.

The sill outer member may include a third joint flange joined to the first joint flange, a fourth joint flange joined to the second joint flange, and a fourth forming portion connected to the third joint flange and the fourth joint flange.

The fourth forming portion may include a joint support surface connected to the third joint flange at a position lower than the first joint flange and configured to support a lower portion of the outer joint bracket and a forming surface extended downward from the joint support surface and connected to the fourth joint flange.

A width of the third joint flange in a vertical direction may be larger than a width of the first joint flange in the vertical direction.

The outer joint bracket may include a first joint portion joined to the joint support surface, a second joint portion extended upward from the first joint portion and joined to the third joint flange, and a third joint portion extended downward from the first joint portion and joined to the forming surface.

It may further include at least one fastening bolt engaged to the lower portion of the pillar member, the outer joint bracket, and the inner joint bracket.

An exemplary connection structure of tubular type pillars may further include a first fastening bolt configured to width-directionally penetrate the lower portion of the pillar member and the outer and inner joint brackets joined to each other and engaged with a nut, a first pipe nut fitted to the lower portion of the pillar member along the vehicle width direction and mounted to width-directionally penetrate the outer joint bracket and the sill outer member joined to each other, and a second fastening bolt engaged to the first pipe nut and having an end disposed in a space between the sill outer member and the sill inner member.

An exemplary connection structure of tubular type pillars may further include a first fastening bolt configured to width-directionally penetrate the lower portion of the pillar member and the outer and inner joint brackets joined to each other and engaged with a nut, a first pipe nut fitted to the lower portion of the pillar member along the vehicle width direction and mounted to width-directionally penetrate the outer joint bracket and the sill outer member joined to each other, a second pipe nut mounted to width-directionally penetrate the sill inner member, and a second fastening bolt engaged to the first pipe nut and the second pipe nut and having an end engaged with a nut.

An exemplary connection structure of tubular type pillars may further include a first pipe nut joined to the lower portion of the pillar member in the vehicle width direction, a first fastening bolt engaged to the first pipe nut, configured to width-directionally penetrate the outer joint bracket and the inner joint bracket joined to each other, and having an end engaged with a nut, a second pipe nut disposed below the first pipe nut and joined to the lower portion of the pillar member in the vehicle width direction, and a second fastening bolt engaged to the second pipe nut, configured to width-directionally penetrate the outer joint bracket and the sill outer member joined to each other, and having an end engaged with a nut.

A cross-section of the pillar member may be trapezoidal.

According to an embodiment, a connection structure of tubular type pillars is capable of securing connection rigidity of the tubular type pillars and a side sill while maintaining structural variability of an upper body in vehicle body length direction.

Other effects that may be obtained or are predicted by exemplary embodiments will be explicitly or implicitly described in a detailed description of embodiments of the present invention. That is, various effects that are predicted according to exemplary embodiments will be described in the following detailed description.

BRIEF DESCRIPTION OF THE DRAWINGS

The drawings are intended to be used as references for describing the exemplary embodiments of the present invention, and the accompanying drawings should not be construed as limiting the technical spirit of the present invention.

It should be understood that the above-referenced drawings are not necessarily to scale, presenting a somewhat simplified representation of various preferred features illustrative of the basic principles of embodiments of the disclosure. The specific design features of embodiments of the present disclosure, including, for example, specific dimensions, orientations, locations, and shapes, will be determined in part by the particular intended application and use environment.

The following reference identifiers may be used in connection with the accompanying drawings to describe exemplary embodiments of the present disclosure.

| | |
|---|---|
| 1: vehicle body | 3: underbody |
| 5: upper body | 7: side structure |
| 9: roof structure | 10: pillar |
| 11: pillar member | 13: trapezoidal cross-section |
| 20: side sill | 21: sill inner member |
| 23: first joint flange | 25: second joint flange |
| 27: third forming portion | 29: first forming surface |
| 31: sill outer member | 33: third joint flange |
| 35: fourth joint flange | 37: fourth forming portion |
| 38: joint support surface | 39: second forming surface |
| 40: outer joint bracket | 41: first forming portion |
| 43: first joint portion | 45: second joint portion |
| 47: third joint portion | 50: inner joint bracket |
| 51: second forming portion | 52: box cross-section |
| 60, 160, 285: first fastening bolt | 61, 161, 261, 173, 273: nut |
| 70, 171, 281: first pipe nut | 90, 190, 295: second fastening bolt |
| 100, 200, 300: connection structure of tubular type pillars | |
| 172, 291: second pipe nut | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present invention. As used herein, the singular forms are intended to include the plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or are indirectly connected through one or more intermediary components, by welding, self-piercing rivet (SPR), structural adhesive, and the like.

It is understood that the term "vehicle," "vehicular," "car," or other similar term as used herein is inclusive of, in general, passenger automobiles including sports cars, sport utility vehicles (SUVs), buses, trucks, various commercial vehicles, and inclusive of hybrid vehicles, electric vehicles, hybrid electric vehicles, hydrogen-powered vehicles, purpose-built vehicles (PBVs), and other alternative fuel vehicles (e.g., fuels derived from resources other than petroleum).

Hereinafter, embodiments of the present disclosure are described in detail with reference to the accompanying drawings.

Figure 1:
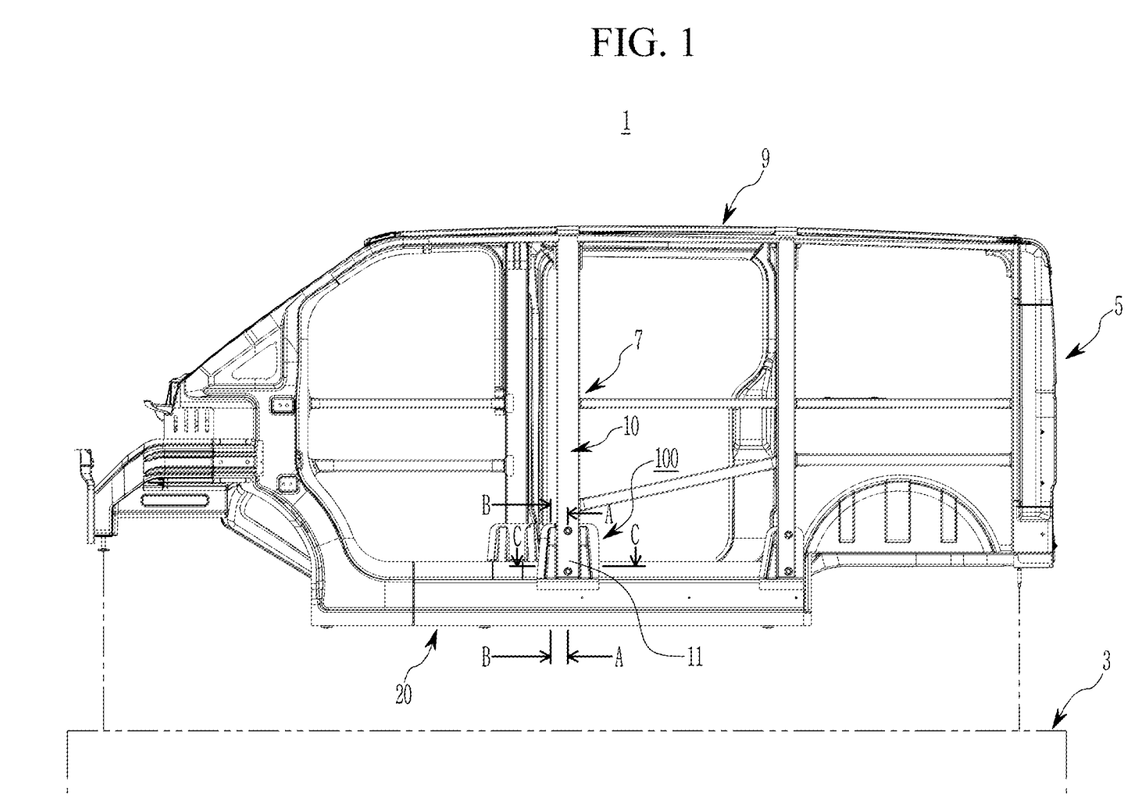
FIG. 1 is a lateral view showing a vehicle body applied with a connection structure of tubular type pillars according to an exemplary embodiment.

FIG. 1 is a lateral view showing a vehicle body applied with a connection structure of tubular type pillars according to an exemplary embodiment.

Referring to FIG. 1, a connection structure 100 of tubular type pillars according to an exemplary embodiment may be applied to, for example, a vehicle body 1 of a purpose-built mobility vehicle (hereinafter called a PBV).

In an example, the PBV may be utilized as an electric vehicle-based module vehicle configured to provide various services to occupants while travelling to a destination in an autonomous driving method. Such a PBV may be manufactured in a one-box design with a large interior space.

The vehicle body 1 of the PBV includes an underbody 3 (frequently called a rolling chassis or a chassis frame by those skilled in the art) of a skateboard type and an upper body 5 assembled to the underbody 3.

Vehicle parts such as a battery assembly (not shown) and a drive motor may be installed on the underbody 3. In addition, the upper body 5 may be a body-in-white (BIW) body assembled to the underbody 3 and may form a cabin space of a large interior space.

In this disclosure, with reference to the vehicle body, a vehicle body back-and-forth direction (i.e., a vehicle body length direction or longitudinal direction), a vehicle width direction (i.e., a vehicle body transverse direction or lateral direction), and a vertical direction (i.e., a height direction) may be taken as reference directions in describing constituent elements.

Furthermore, in this specification, "upper end portion", "upper portion", "upper end", or "upper portion surface" of a component indicates an end portion, portion, end, or surface of the component that is relatively positioned higher in the drawing, and "lower end portion", "lower portion", "lower end", or "lower portion surface" of a component indicates an end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component including the end.

Meanwhile, the upper body 5 includes a side structure 7 and a roof structure 9 that are provided on each side in the vehicle width direction.

In an exemplary embodiment, the side structure 7 and the roof structure 9 may configure a space frame in which a plurality of tubular type members are multi-directionally coupled to form the interior space of the vehicle body 1.

Furthermore, in an exemplary embodiment, the side structure 7 includes a plurality of pillars 10 vertically connected to the roof structure 9 and a side sill 20 connected to respective lower portions of the plurality of pillars 10.

Each of the plurality of pillars 10 may be provided as a tubular type member. In addition, the side sill 20 may be connected to both sides of the underbody 3 in the vehicle width direction.

In embodiments of the disclosure, a structure in which a pillar member 11 of a pillar 10 of the plurality of pillars 10 is connected to the side sill 20 is taken an example. In addition, in embodiments of the present disclosure, with reference to the vehicle width direction of the vehicle body 1, an interior area between the side sills 20 is called "inner", and an area outside the side sills 20 is called "outer".

A connection structure 100 of tubular type pillars according to an exemplary embodiment is structured to improve structural variability (or expandability) of the upper body 5 in the vehicle body length direction.

In addition, an exemplary embodiment provides a connection structure 100 of tubular type pillars that may secure connection rigidity of the side sill 20 and a lower portion of the pillar member 11 and improve impact resistive performance of the vehicle body 1.

Figure 2:
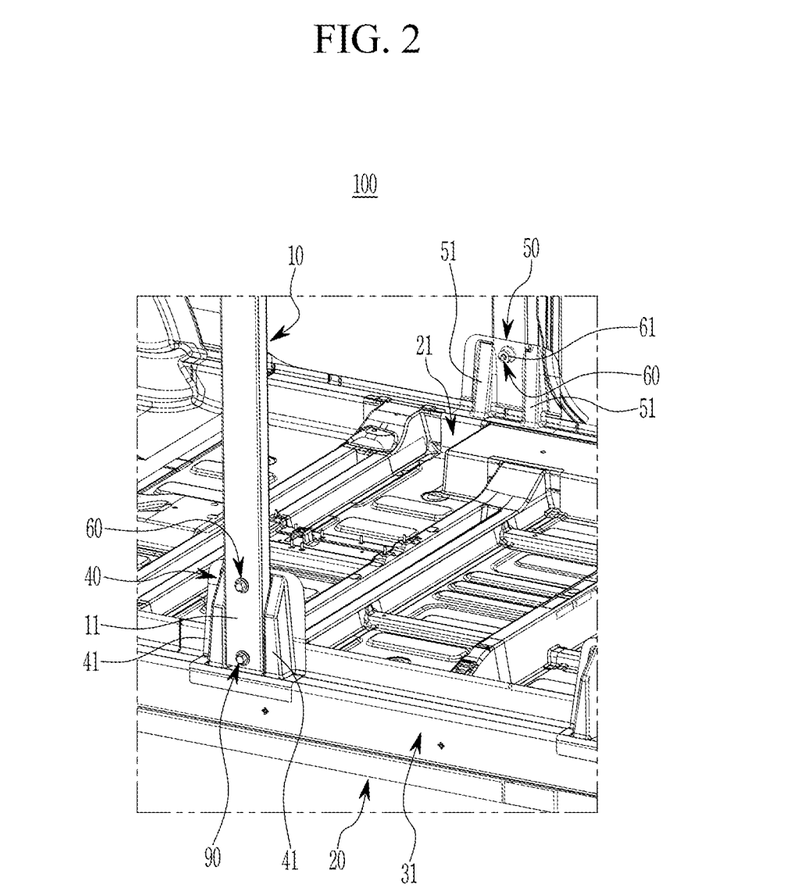
FIG. 2 is a perspective view showing a connection structure of tubular type pillars according to an exemplary embodiment.
Figure 3:
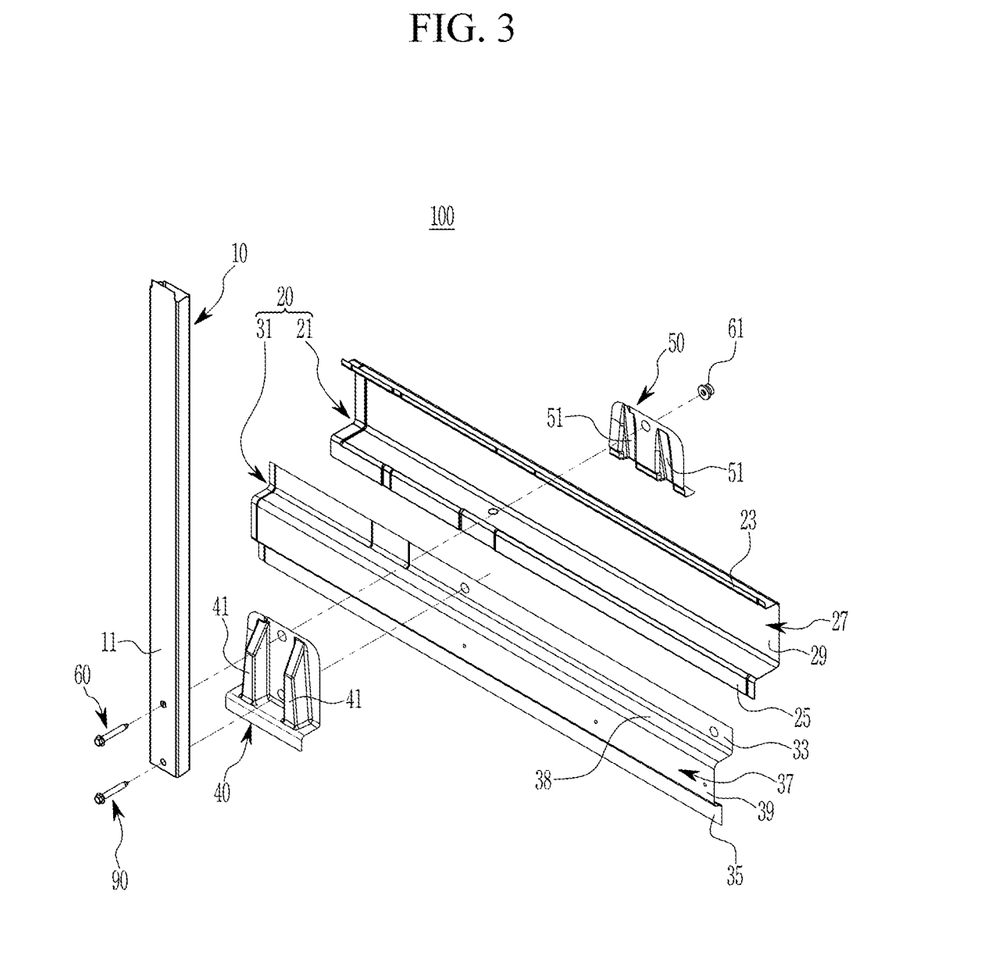
FIG. 3 is an exploded perspective view showing a connection structure of tubular type pillars according to an exemplary embodiment.
Figure 4:
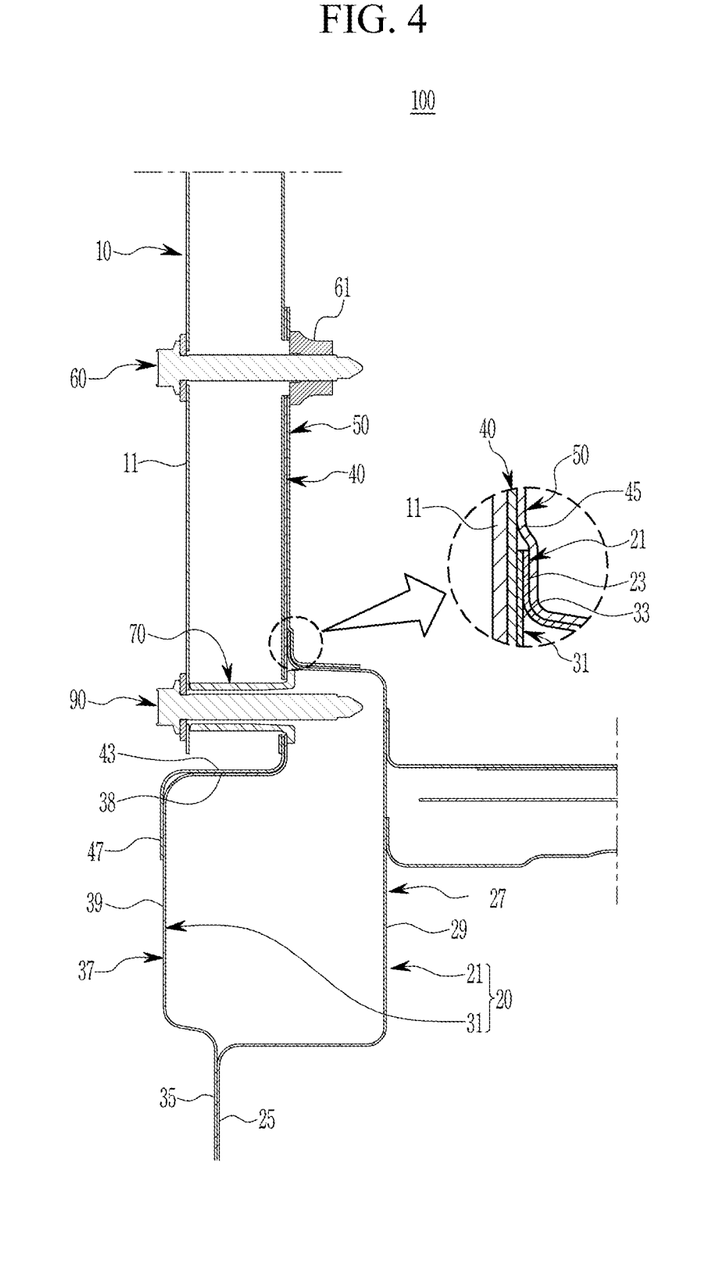
FIG. 4 is a cross-sectional view taken along line A-A of FIG. 1 showing a connection structure of tubular type pillars according to an exemplary embodiment.

FIG. 2 is a perspective view showing a connection structure of tubular type pillars according to an exemplary embodiment. FIG. 3 is an exploded perspective view showing a connection structure of tubular type pillars according to an exemplary embodiment. FIG. 4 is a cross-sectional view taken along line A-A of FIG. 1 showing a connection structure of tubular type pillars according to an exemplary embodiment.

Referring to FIG. 2 to FIG. 4, the connection structure 100 of tubular type pillars according to an exemplary embodiment includes an outer joint bracket 40 and an inner joint bracket 50.

In an exemplary embodiment, the outer joint bracket 40 includes a pair of first forming portions 41. In addition, the inner joint bracket 50 includes a pair of second forming portions 51.

Prior to the detailed description on the configuration of the outer joint bracket 40 and the inner joint bracket 50, in the configuration of the above-mentioned side sill 20, the side sill 20 includes a sill inner member 21 and a sill outer member 31 that are joined to each other.

The sill inner member 21 includes a first joint flange 23, a second joint flange 25, and a third forming portion 27.

The first joint flange 23 is formed on an upper portion of the sill inner member 21 along the vehicle body length direction. The second joint flange 25 is formed on a lower portion of the sill inner member 21 along the vehicle body length direction. In addition, the third forming portion 27 is connected to the first joint flange 23 and the second joint flange 25 along the vertical direction.

Here, the third forming portion 27 is extended inward from the first joint flange 23 and the second joint flange 25 and disposed along the vehicle body length direction. The third forming portion 27 includes a first forming surface 29.

The sill outer member 31 includes a third joint flange 33, a fourth joint flange 35, and a fourth forming portion 37.

The third joint flange 33 is formed on an upper portion of the sill outer member 31 along the vehicle body length direction. The third joint flange 33 is joined (e.g., welded) to the first joint flange 23 of the sill inner member 21.

The fourth joint flange 35 is formed on a lower portion of the sill outer member 31 along the vehicle body length direction. The fourth joint flange 35 is joined (e.g., welded) to the second joint flange 25 of the sill inner member 21.

In addition, the fourth forming portion 37 is connected to the third joint flange 33 and the fourth joint flange 35 along the vertical direction. Here, the fourth forming portion 37 is extended outward from the third joint flange 33 and the fourth joint flange 35 and disposed along the vehicle body length direction.

In an exemplary embodiment, the fourth forming portion 37 includes a joint support surface 38 and a second forming surface 39.

The joint support surface 38 is configured to support a lower portion of the outer joint bracket 40 that will be further described later. The joint support surface 38 is provided as an upper surface of the fourth forming portion 37, and may be formed at a position lower than the upper portion of the sill inner member 21. That is, the joint support surface 38 is vertically connected to the third joint flange 33 at a position lower than the first joint flange 23 of the sill inner member 21.

In addition, the second forming surface 39 is extended downward from the joint support surface 38 and connected to the fourth joint flange 35. The third joint flange 33 may be formed having a width in the vertical direction larger than a width of the first joint flange 23 in the vertical direction.

Meanwhile, the outer joint bracket 40 according to an exemplary embodiment is configured to connect (e.g., couple) the lower portion of the pillar member 11 to the side sill 20. The outer joint bracket 40 is coupled to the sill outer member 31 and coupled to the lower portion of the pillar member 11.

The lower portion of the pillar member 11 may be fitted and coupled to the outer joint bracket 40 along the vehicle width direction.

Figure 5:
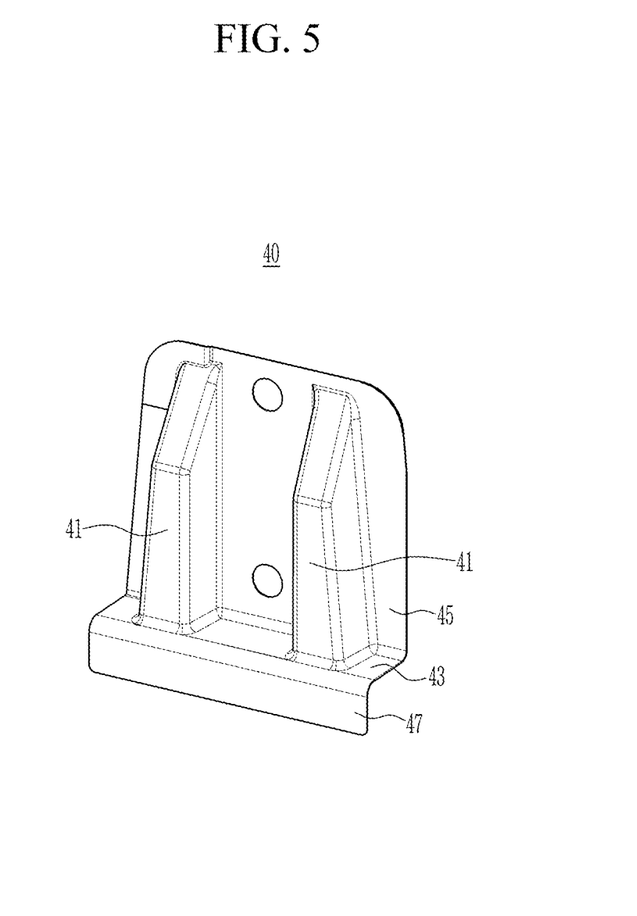
FIG. 5 is a perspective view showing an outer joint bracket applied to a connection structure of tubular type pillars according to an exemplary embodiment.

FIG. 5 is a perspective view showing an outer joint bracket applied to a connection structure of tubular type pillars according to an exemplary embodiment.

Referring to FIG. 2 to FIG. 5, the outer joint bracket 40 according to an exemplary embodiment includes the pair of first forming portions 41 mentioned above.

The pair of first forming portions 41 is formed on an outer surface of the outer joint bracket 40 such that the lower portion of the pillar member 11 may be fitted along the vehicle width direction. The pair of first forming portions 41 are extended outward from the outer surface of the outer joint bracket 40 with a predetermined distance along the vehicle body length direction.

Here, the lower portion of the pillar member 11 may be fitted and coupled between the pair of first forming portions 41 along the vehicle width direction.

Furthermore, the outer joint bracket 40 according to an exemplary embodiment includes a first joint portion 43, a second joint portion 45, and a third joint portion 47.

The first joint portion 43 is joined (e.g., welded) to the joint support surface 38 of the sill outer member 31. The second joint portion 45 is extended upward from the first joint portion 43 and joined (e.g., welded) to the third joint flange 33 of the sill outer member 31. In addition, the third joint portion 47 is extended downward from the first joint portion 43 and joined (e.g., welded) to the second forming surface 39 of the sill outer member 31.

Referring to FIG. 2 to FIG. 4, the inner joint bracket 50 according to an exemplary embodiment is configured to connect (e.g., couple) the lower portion of the pillar member 11 to the side sill 20, together with the outer joint bracket 40. The inner joint bracket 50 is coupled to the sill inner member 21 and coupled to the outer joint bracket 40.

Figure 6:
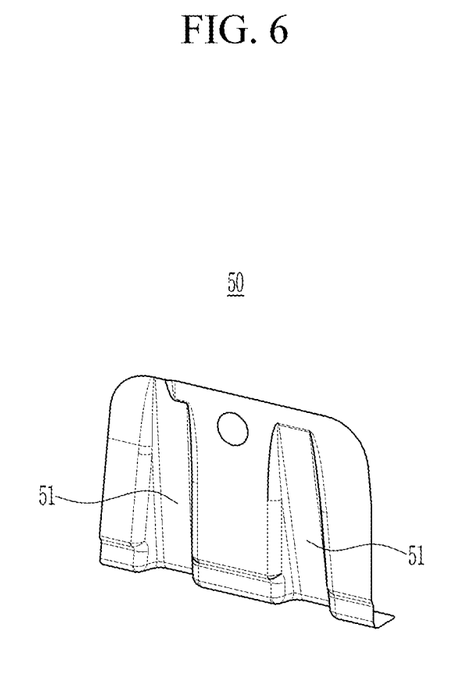
FIG. 6 is a perspective view showing an inner joint bracket applied to a connection structure of tubular type pillars according to an exemplary embodiment.

FIG. 6 is a perspective view showing an inner joint bracket applied to a connection structure of tubular type pillars according to an exemplary embodiment.

Referring to FIG. 2 to FIG. 6, the inner joint bracket 50 according to an exemplary embodiment is joined to the first joint flange 23 of the sill inner member 21 and the third forming portion 27 and joined (e.g., welded) to the second joint portion 45 of the outer joint bracket 40.

Furthermore, the inner joint bracket 50 includes the pair of second forming portions 51 mentioned above.

Figure 7:
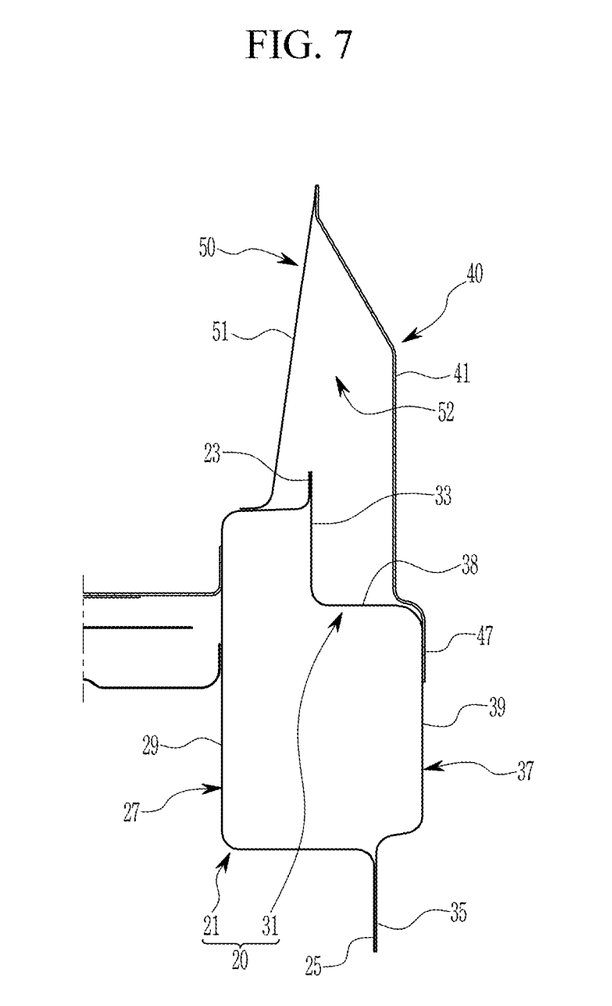
FIG. 7 is a cross-sectional view taken along line B-B of FIG. 1 showing a connection structure of tubular type pillars according to an exemplary embodiment.

As shown in FIG. 7, the pair of second forming portions 51 are combined with the pair of first forming portions 41 of the outer joint bracket 40 to form a box cross-section 52.

The pair of second forming portions 51 are formed on an inner surface of the inner joint bracket 50. The pair of second forming portions 51 are extended inward from the inner surface of the inner joint bracket 50 with a predetermined distance along the vehicle body length direction.

That is, the outer joint bracket 40 and the inner joint bracket 50 are joined to each other and may form the box cross-section 52 by the combination of the pair of first forming portions 41 and the pair of second forming portions 51.

Referring to FIG. 2 to FIG. 4, a connection structure 100 of tubular type pillars according to an exemplary embodiment further includes a fastening unit configured to engage the lower portion of the pillar member 11, the outer joint bracket 40, and the inner joint bracket 50.

Here, while the outer joint bracket 40 and the inner joint bracket 50 are coupled to each other, the lower portion of the pillar member 11 may be fitted between the pair of first forming portions 41 of the outer joint bracket 40 along the vehicle width direction and engaged to the outer joint bracket 40 and the inner joint bracket 50 by the fastening unit. Furthermore, the lower portion of the pillar member 11 may be engaged to the sill inner member 21 and the sill outer member 31 by the fastening unit, together with the outer joint bracket 40 and the inner joint bracket 50.

In an exemplary embodiment, the fastening unit includes a first fastening bolt 60, a first pipe nut 70, and a second fastening bolt 90.

The first fastening bolt 60 width-directionally penetrates the lower portion of the pillar member 11 and the outer and inner joint brackets 40 and 50 joined to each other and engaged with a nut 61.

Here, an end of the first fastening bolt 60 protrudes from the inner surface of the inner joint bracket 50. In addition, the nut 61 may be a weld nut joined to the inner surface of the inner joint bracket 50.

The first pipe nut 70 is fitted to the lower portion of the pillar member 11 along the vehicle width direction and mounted to width-directionally penetrate the outer joint bracket 40 and the sill outer member 31 joined to each other.

In addition, the second fastening bolt 90 is engaged to the first pipe nut 70 and has an end disposed in a space between the sill inner member 21 and the sill outer member 31.

Figure 8:
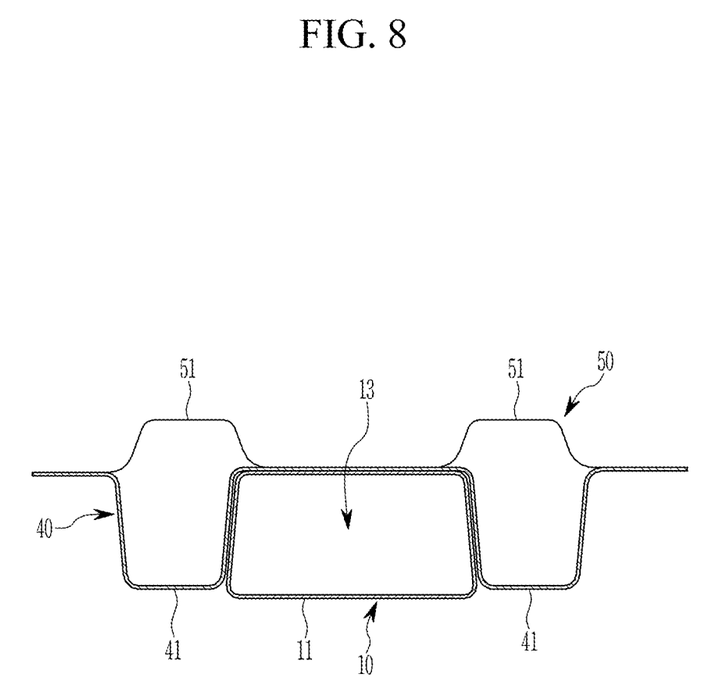
FIG. 8 is a cross-sectional view taken along line C-C of FIG. 1 showing a connection structure of tubular type pillars according to an exemplary embodiment.

As shown in FIG. 8, the tubular type pillar member 11 engaged to the sill inner member 21, the sill outer member 31, the outer joint bracket 40, and the inner joint bracket 50 by the fastening unit may have a trapezoidal cross-section 13. Since the pillar member 11 is formed with the trapezoidal cross-section 13, ease of assembly of the lower portion of the pillar member 11 with respect to the outer joint bracket 40 may be improved.

Hereinafter, an assembling process and an operation of the connection structure 100 of tubular type pillars according to an exemplary embodiment are described in detail with reference to FIG. 1 to FIG. 8.

First, the side sill 20 is coupled to both sides of the underbody 3 in the vehicle width direction. The side sill 20 is structured to have the sill inner member 21 and the sill outer member 31 joined to each other.

Upper portions of the sill inner member 21 and the sill outer member 31 are joined to each other through the first joint flange 23 and the third joint flange 33, and lower portions of the sill inner member 21 and the sill outer member 31 are joined to each other through the second joint flange 25 and the fourth joint flange 35.

Here, the sill outer member 31 includes the joint support surface 38 and the second forming surface 39 formed on the fourth forming portion 37. At this time, the joint support surface 38 is formed at a position lower than the first joint flange 23 of the sill inner member 21.

In such a state, the inner joint bracket 50 is joined to the sill inner member 21, and the outer joint bracket 40 is joined to the sill outer member 31.

Here, the outer joint bracket 40 is joined to the joint support surface 38 of the sill outer member 31 through the first joint portion 43. The outer joint bracket 40 is joined to the third joint flange 33 of the sill outer member 31 through the second joint portion 45 and joined to the inner joint bracket 50. In addition, the outer joint bracket 40 is joined to the second forming surface 39 of the sill outer member 31 through the third joint portion 47.

At this time, the pair of first forming portions 41 of the outer joint bracket 40 and the pair of second forming portions 51 of the inner joint bracket 50 are combined to form the box cross-section 52.

While the outer joint bracket 40 and the inner joint bracket 50 are coupled to the side sill 20, the lower portion of the pillar member 11 is fitted between the pair of first forming portions 41 along the vehicle width direction. At this time, the lower portion of the pillar member 11 is fitted to the first pipe nut 70 along the vehicle width direction.

Thereafter, the first fastening bolt 60 width-directionally penetrates the lower portion of the pillar member 11 and the outer and inner joint brackets 40 and 50 joined to each other. In addition, the nut 61 is engaged with the end of the first fastening bolt 60. Thereby, the lower portion of the pillar member 11 is coupled to the upper portions of the outer joint bracket 40 and the inner joint bracket 50 joined to each other through the first fastening bolt 60.

In addition, the second fastening bolt 90 is engaged to the first pipe nut 70. Then, the lower portion of the pillar member 11 is coupled to the outer joint bracket 40 and the sill outer member 31 joined to each other through the second fastening bolt 90. At this time, an end of the second fastening bolt 90 is disposed in a space between the sill inner member 21 and the sill outer member 31.

According to the connection structure 100 of tubular type pillars according to an exemplary embodiment, since the lower portion of the pillar member 11 is coupled to the side sill 20 through the outer joint bracket 40 and the inner joint bracket 50, structural variability (or expandability) of the upper body 5 in the vehicle body length direction may be maintained or improved.

In addition, according to the connection structure 100 of tubular type pillars according to an exemplary embodiment, the lower portion of the pillar member 11 is fitted to the outer joint bracket 40 and may be engaged with the outer joint bracket 40, the inner joint bracket 50, and the side sill 20 through the fastening unit.

Therefore, according to the connection structure 100 of tubular type pillars according to an exemplary embodiment, connection rigidity of the lower portion of the pillar member 11 and the side sill 20 may be secured, and side impact resistive performance of the vehicle body 1 may be improved.

In addition, according to the connection structure 100 of tubular type pillars according to an exemplary embodiment, since the outer joint bracket 40 is coupled to the joint support surface 38 of the sill outer member 31 at a position lower than the upper portion of the sill inner member 21, the supporting strength of the side sill 20 supporting the lower portion of the pillar member 11 may be secured.

Furthermore, according to the connection structure 100 of tubular type pillars according to an exemplary embodiment, since the box cross-section 52 is formed by the outer joint bracket 40 and the inner joint bracket 50 joined to each other, strength and durability of the connection of the lower portion of the pillar member 11 and the side sill 20 may be improved.

Figure 9:
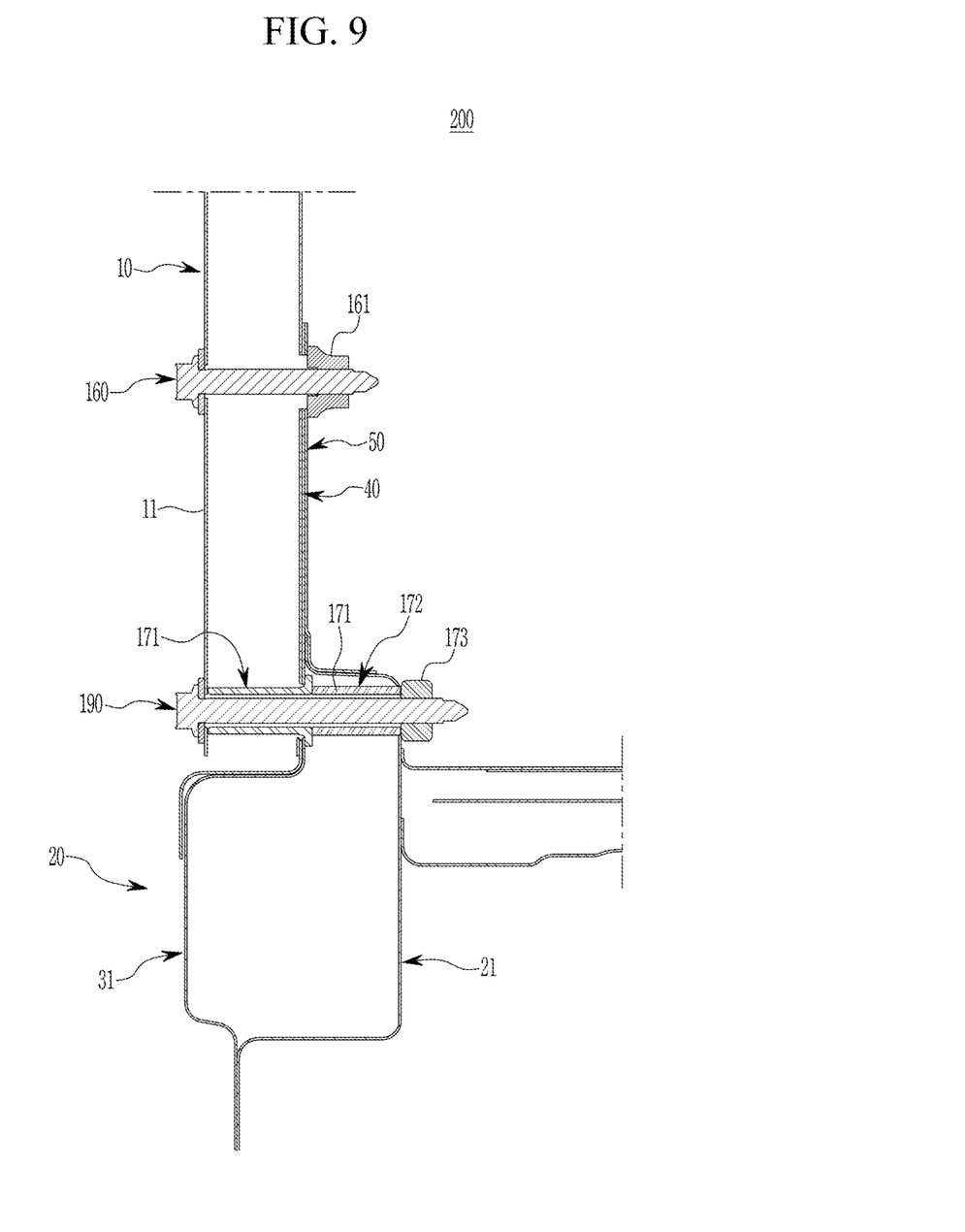
FIG. 9 is a cross-sectional view showing a connection structure of tubular type pillars according to another exemplary embodiment.

FIG. 9 is a cross-sectional view showing a connection structure of tubular type pillars according to another exemplary embodiment. In the drawings, the same reference numerals as in the previous embodiment are assigned to the same components as those of the previous embodiment.

Referring to FIG. 9, a connection structure 200 of tubular type pillars according to another exemplary embodiment may include, as the fastening unit, a first fastening bolt 160, a first pipe nut 171, a second pipe nut 172, and a second fastening bolt 190.

The first fastening bolt 160 width-directionally penetrates the lower portion of the pillar member 11 and the outer and inner joint brackets 40 and 50 joined to each other and engaged with a nut 161.

Here, an end of the first fastening bolt 160 protrudes from the inner surface of the inner joint bracket 50. In addition, the nut 161 may be a weld nut joined to the inner surface of the inner joint bracket 50.

The first pipe nut 171 is fitted to the lower portion of the pillar member 11 along the vehicle width direction and mounted to width-directionally penetrate the outer joint bracket 40 and the sill outer member 31 joined to each other.

The second pipe nut 172 is mounted to width-directionally penetrate the sill inner member 21.

In addition, the second fastening bolt 190 is engaged to the first pipe nut 171 and the second pipe nut 172. A nut 173 is engaged with an end of the second fastening bolt 190. The nut 173 may be a weld nut joined to an inner surface of the sill inner member 21.

Here, since the second fastening bolt 190 is engaged with the first pipe nut 171, the second pipe nut 172, the outer joint bracket 40, the sill inner member 21, and the sill outer member 31, structural rigidity of the side sill 20 and the lower portion of the pillar member 11 may be further improved.

Other detailed configurations and operations of the connection structure 200 of tubular type pillars according to another exemplary embodiment are the same as the above-described embodiment and may be clearly understood therefrom.

Figure 10:
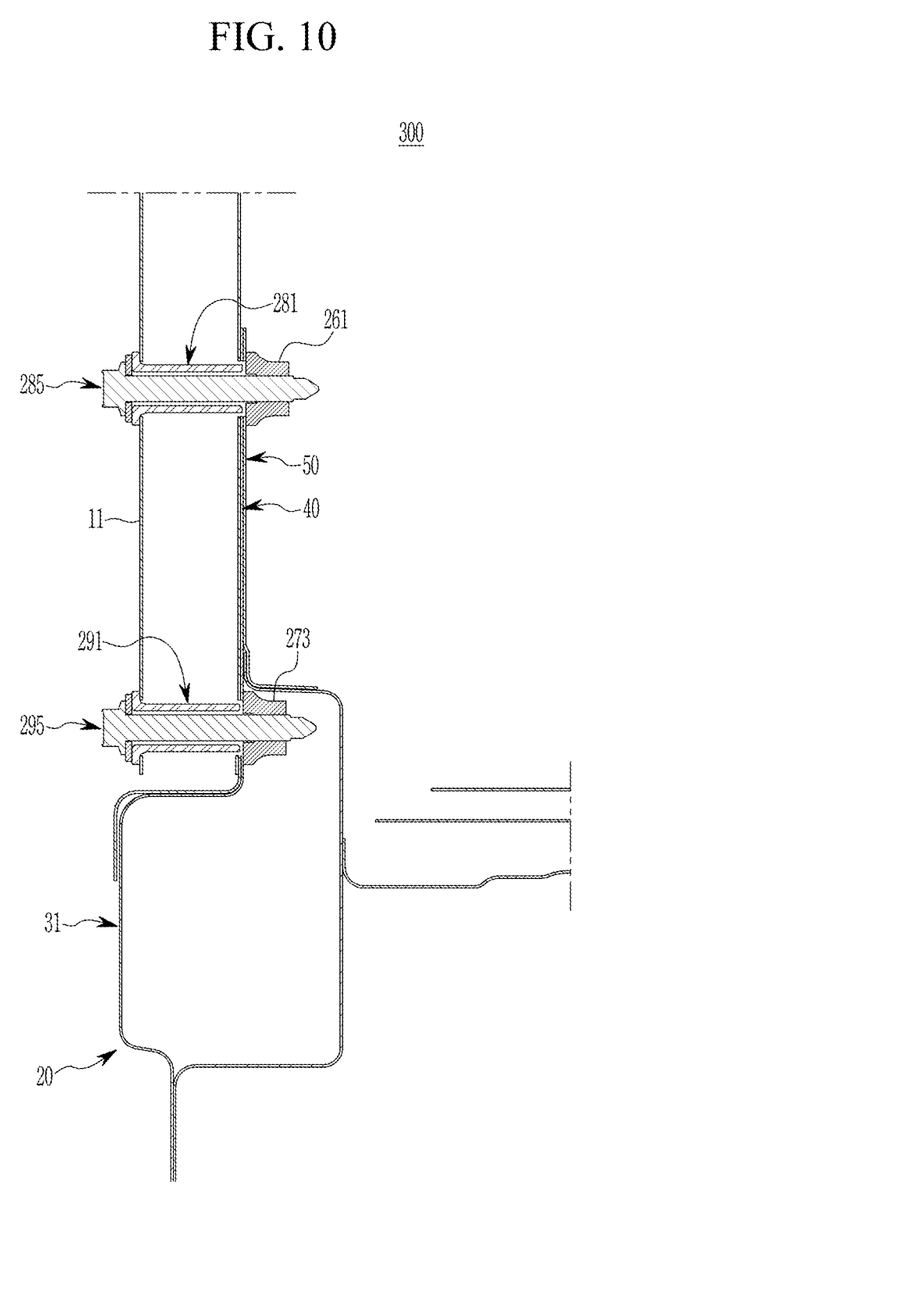
FIG. 10 is a cross-sectional view showing a connection structure of tubular type pillars according to still another exemplary embodiment.

FIG. 10 is a cross-sectional view showing a connection structure of tubular type pillars according to still another exemplary embodiment. In the drawings, the same reference numerals as in the previous embodiments are assigned to the same components as those of the previous embodiments.

Referring to FIG. 10, a connection structure 300 of tubular type pillars according to still another exemplary embodiment may include, as the fastening unit, a first pipe nut 281, a first fastening bolt 285, a second pipe nut 291, and a second fastening bolt 295.

The first pipe nut 281 width-directionally penetrates the lower portion of the pillar member 11 and is joined to the pillar member 11.

The first fastening bolt 285 is engaged to the first pipe nut 281. The first fastening bolt 285 width-directionally penetrates the outer joint bracket 40 and the inner joint bracket 50 joined to each other. A nut 261 is engaged with an end of the first fastening bolt 285. The nut 261 may be a weld nut joined to the inner surface of the inner joint bracket 50.

The second pipe nut 291 is disposed below the first pipe nut 281, is configured to width-directionally penetrate the lower portion of the pillar member 11, and is joined to the pillar member 11.

In addition, the second fastening bolt 295 is engaged to the second pipe nut 291. The second fastening bolt 295 width-directionally penetrates the outer joint bracket 40 and the sill outer member 31 joined to each other. A nut 273 is engaged with an end of the second fastening bolt 295. The nut 273 may be a weld nut joined to an inner surface of the sill outer member 31.

Here, since the second fastening bolt 295 is engaged with the second pipe nut 291, the outer joint bracket 40, and the sill outer member 31, structural rigidity of the side sill 20 and the lower portion of the pillar member 11 may be further improved.

Other detailed configurations and operations of the connection structure 300 of tubular type pillars according to still another exemplary embodiment are the same as the above-described embodiments and may be clearly understood therefrom.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A connection structure of tubular type pillars, the connection structure comprising:
   an outer joint bracket coupled to a sill outer member of a side sill, wherein a lower portion of a pillar member is fitted and coupled to the outer joint bracket along a vehicle width direction, wherein the outer joint bracket comprises a pair of first forming portions extended outward from an outer surface of the outer joint bracket with a predetermined distance along a vehicle body length direction such that the lower portion of the pillar member is fitted along the vehicle width direction; and
   an inner joint bracket coupled to a sill inner member and coupled to the outer joint bracket, wherein the sill inner member and the sill outer member are joined to each other.

2. The connection structure of claim 1, wherein the inner joint bracket comprises a pair of second forming portions extended inward from an inner surface of the inner joint bracket with a predetermined distance along the vehicle body length direction, and wherein the pair of second forming portions is combined with the pair of first forming portions to define a box cross-section.

3. The connection structure of claim 1, wherein the sill outer member comprises a joint support surface disposed at a position lower than an upper portion of the sill inner member and configured to support a lower portion of the outer joint bracket coupled to the lower portion of the pillar member.

4. The connection structure of claim 1, wherein:
   the sill inner member comprises a first joint flange provided on an upper portion, a second joint flange provided on a lower portion, and a third forming portion connected to the first joint flange and the second joint flange; and
   the sill outer member comprises a third joint flange joined to the first joint flange, a fourth joint flange joined to the second joint flange, and a fourth forming portion connected to the third joint flange and the fourth joint flange.

5. The connection structure of claim 4, wherein the fourth forming portion comprises:
   a joint support surface connected to the third joint flange at a position lower than the first joint flange and configured to support a lower portion of the outer joint bracket; and
   a forming surface extended downward from the joint support surface and connected to the fourth joint flange.

6. The connection structure of claim 5, wherein the outer joint bracket comprises:
   a first joint portion joined to the joint support surface;
   a second joint portion extended upward from the first joint portion and joined to the third joint flange; and
   a third joint portion extended downward from the first joint portion and joined to the forming surface.

7. The connection structure of claim 4, wherein a width of the third joint flange in a vertical direction is larger than a width of the first joint flange in the vertical direction.

8. The connection structure of claim 1, further comprising a fastening bolt engaged to the lower portion of the pillar member, the outer joint bracket, and the inner joint bracket.

9. The connection structure of claim 1, further comprising:
   a first fastening bolt configured to width-directionally penetrate the lower portion of the pillar member and the outer and inner joint brackets joined to each other, the first fastening bolt being engaged with a nut;
   a first pipe nut fitted to the lower portion of the pillar member along the vehicle width direction and mounted to width-directionally penetrate the outer joint bracket and the sill outer member joined to each other; and
   a second fastening bolt engaged to the first pipe nut and having an end disposed in a space between the sill outer member and the sill inner member.

10. The connection structure of claim 1, further comprising:
    a first fastening bolt configured to width-directionally penetrate the lower portion of the pillar member and the outer and inner joint brackets joined to each other, the first fastening bolt being engaged with a nut;
    a first pipe nut fitted to the lower portion of the pillar member along the vehicle width direction and mounted to width-directionally penetrate the outer joint bracket and the sill outer member joined to each other;
    a second pipe nut mounted to width-directionally penetrate the sill inner member; and
    a second fastening bolt engaged to the first pipe nut and the second pipe nut and having an end engaged with a nut.

11. The connection structure of claim 1, further comprising:
    a first pipe nut joined to the lower portion of the pillar member in the vehicle width direction;
    a first fastening bolt engaged to the first pipe nut, configured to width-directionally penetrate the outer joint bracket and the inner joint bracket joined to each other, and having an end engaged with a nut;
    a second pipe nut disposed below the first pipe nut and joined to the lower portion of the pillar member in the vehicle width direction; and
    a second fastening bolt engaged to the second pipe nut, configured to width-directionally penetrate the outer joint bracket and the sill outer member joined to each other, and having an end engaged with a nut.

12. The connection structure of claim 1, wherein a cross-section of the pillar member is trapezoidal.

13. A vehicle comprising:
    an underbody;
    a side sill connected to the underbody and comprising a sill inner member joined to a sill outer member;
    an upper body coupled to the underbody and comprising a roof structure and a side structure, wherein the side structure comprises a plurality of pillars, and wherein an upper portion of a pillar of the plurality of pillars is connected to the roof structure;
    an outer joint bracket coupled to the sill outer member of the side sill, wherein a lower portion of the pillar is fitted and coupled to the outer joint bracket along a vehicle width direction, wherein the outer joint bracket comprises a pair of first forming portions extended outward from an outer surface of the outer joint bracket with a predetermined distance along a vehicle body length direction such that the lower portion of the pillar is fitted along the vehicle width direction; and an inner joint bracket coupled to the sill inner member and coupled to the outer joint bracket.

14. The vehicle of claim 13, wherein the inner joint bracket comprises a pair of second forming portions extended inward from an inner surface of the inner joint bracket with a predetermined distance along the vehicle body length direction, and wherein the pair of second forming portions is combined with the pair of first forming portions to define a box cross-section.

15. The vehicle of claim 13, wherein the sill outer member comprises a joint support surface disposed at a position lower than an upper portion of the sill inner member and configured to support a lower portion of the outer joint bracket coupled to the lower portion of the pillar.

16. The vehicle of claim 13, wherein:
the sill inner member comprises a first joint flange provided on an upper portion, a second joint flange provided on a lower portion, and a third forming portion connected to the first joint flange and the second joint flange; and
the sill outer member comprises a third joint flange joined to the first joint flange, a fourth joint flange joined to the second joint flange, and a fourth forming portion connected to the third joint flange and the fourth joint flange.

17. The vehicle of claim 16, wherein:
the fourth forming portion comprises:
a joint support surface connected to the third joint flange at a position lower than the first joint flange and configured to support a lower portion of the outer joint bracket; and
a forming surface extended downward from the joint support surface and connected to the fourth joint flange; and wherein the outer joint bracket comprises:
a first joint portion joined to the joint support surface;
a second joint portion extended upward from the first joint portion and joined to the third joint flange; and
a third joint portion extended downward from the first joint portion and joined to the forming surface.

18. The vehicle of claim 13, further comprising a fastening bolt engaged to the lower portion of the pillar, the outer joint bracket, and the inner joint bracket.

19. A connection structure of tubular type pillars, the connection structure comprising:
an outer joint bracket coupled to a sill outer member of a side sill, wherein a lower portion of a pillar member is fitted and coupled to the outer joint bracket along a vehicle width direction;
an inner joint bracket coupled to a sill inner member and coupled to the outer joint bracket, wherein the sill inner member and the sill outer member are joined to each other;
a first fastening bolt configured to width-directionally penetrate the lower portion of the pillar member and the outer and inner joint brackets joined to each other, the first fastening bolt being engaged with a nut;
a first pipe nut fitted to the lower portion of the pillar member along the vehicle width direction and mounted to width-directionally penetrate the outer joint bracket and the sill outer member joined to each other; and
a second fastening bolt engaged to the first pipe nut and having an end disposed in a space between the sill outer member and the sill inner member.

20. The connection structure of claim 19, wherein the inner joint bracket comprises a pair of second forming portions extended inward from an inner surface of the inner joint bracket with a predetermined distance along a vehicle body length direction, and wherein the pair of second forming portions is combined with the pair of first forming portions to define a box cross-section.

\* \* \* \* \*